United States Patent [19]
Ima et al.

[11] Patent Number: 6,057,413
[45] Date of Patent: *May 2, 2000

[54] PROPYLENE-ETHYLENE RANDOM COPOLYMER FILM

[75] Inventors: Seiichiro Ima, Ichihara; Kazuki Wakamatsu, Sodegaura; Shigeki Kishiro, Ichihara, all of Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/706,754

[22] Filed: Sep. 3, 1996

[30] Foreign Application Priority Data

Aug. 31, 1995 [JP] Japan ...................... 7-224160

[51] Int. Cl.$^7$ ............................ C08F 210/06; C08F 4/649
[52] U.S. Cl. .................... 526/348; 526/124.3; 526/125.3
[58] Field of Search ................................ 526/348, 125.3, 526/119, 124.3

[56] References Cited

U.S. PATENT DOCUMENTS

| | | |
|---|---|---|
| 5,023,223 | 6/1991 | Ebara et al. . |
| 5,143,880 | 9/1992 | Sasaki et al. . |
| 5,438,110 | 8/1995 | Ishimaru et al. .................... 526/348 |
| 5,608,018 | 3/1997 | Ebara et al. . |
| 5,618,895 | 4/1997 | Kerth et al. ............................ 526/348 |

FOREIGN PATENT DOCUMENTS

| | | |
|---|---|---|
| 0 318 049 A1 | 5/1989 | European Pat. Off. . |
| 0 341 724 A1 | 11/1989 | European Pat. Off. . |
| 0 384 263 A1 | 8/1990 | European Pat. Off. . |
| 0 450 456 A3 | 10/1991 | European Pat. Off. . |
| 0 577 407 A1 | 1/1994 | European Pat. Off. . |
| 577407 | 1/1994 | European Pat. Off. . |
| 0 622 382 A1 | 11/1994 | European Pat. Off. . |
| 0 629 632 A2 | 12/1994 | European Pat. Off. . |
| 3732953 | 4/1989 | Germany . |

*Primary Examiner*—Fred Teskin
*Attorney, Agent, or Firm*—Intellectual Property Group Pillsbury Madison & Sutro LLP

[57] ABSTRACT

A propylene-ethylene random copolymer prepared by copolymerizing propylene with ethylene in the substantial absence of a liquid medium with a catalyst system comprising:

(A) a solid catalyst component containing magnesium, titanium, a halogen and a first electron donor as an essential component, (B) an organoaluminum compound and (C) a second electron donor compound, wherein an ethylene content (E) of the copolymer is from 3.5 to 7.0% by weight, and wherein a content of a xylene-soluble portion at 20° C. (D) of the copolymer satisfies the relationship $D \leq E+2.0$ (% by weight). Films of the copolymer have an excellent appearance (little bleed whitening) and an excellent balance between low-temperature heat-sealing property and rigidity.

3 Claims, No Drawings

PROPYLENE-ETHYLENE RANDOM COPOLYMER FILM

FIELD OF THE INVENTION

The present invention relates to a propylene-ethylene random copolymer, and a film thereof. More particularly, the present invention relates to a propylene-ethylene random copolymer and film thereof having excellent appearance (little bleed whitening) and excellent balance between a low-temperature heat-sealing property and rigidity.

DESCRIPTION OF RELATED ART

Polypropylene film has been widely used in packaging applications such as food and textile packaging because of its excellent appearance, heat-sealing property, heat resistance and rigidity.

Propylene-ethylene random copolymer has widely been used as films or the like because it is superior in strength at low temperature compared to a propylene homopolymer and can be heat-sealed at low temperature.

In a process for producing a propylene-ethylene random copolymer, a solvent polymerization process or a bulk polymerization process has hitherto been used.

In these polymerization processes, a copolymer is obtained by polymerizing propylene and ethylene in a solvent (e.g., n-heptane or n-hexane) or a mixture of liquid monomer (e.g., propylene and/or ethylene) to be polymerized with optional further additional post-treatment. Therefore, a low-molecular weight polymer component which influences, among other things, blocking resistance and bleed whitening is dissolved in the liquid solvent or monomer media and removed. Thus, on one hand, these processes impart preferable characteristics. On the other hand, however, there are some problems: (1) a copolymer component effective for heat-sealing property at low temperature is also dissolved and removed; and (2) when the amount of ethylene is increased, the copolymer cannot be produced because the copolymer then dissolves in the liquid medium. Therefore, producing a material capable of heat sealing at low temperature by such polymerization processes is a major limitation, and an industrially advantageous production process has not been substantially accomplished.

Therefore, production according to a so-called gas phase process, wherein a solvent or liquid monomer is not used, has been investigated to resolve the above problems. However, when a merely conventional catalyst is used in a vapor phase process, a component which negatively influences blocking resistance and bleed whitening remains in the product, which results in deterioration of film performance.

The present inventors have intensively investigated the preparation of a propylene-ethylene random copolymer which in film form has excellent appearance (little bleed whitening) and an excellent balance between low-temperature heat-sealing properties and rigidity. This is accomplished without adverse affect on transparency, which is one of the important characteristics of a film of polypropylene prepared by a vapor phase process. This has not been accomplished by the prior art. A propylene random copolymer according to the present invention is obtained with use of specific polymerization conditions, wherein the copolymer's content of xylene-soluble portion at 20° C. falls within a specific range.

SUMMARY OF THE INVENTION

An object of the present invention is a propylene-ethylene random copolymer which, as a film, has excellent appearance (little bleed whitening) and an excellent balance between low-temperature heat-sealing property and rigidity but without loss of transparency, which a preferred characteristic.

This and other objects of the present invention are achieved by a propylene-ethylene random copolymer prepared by copolymerizing propylene with ethylene in the substantial absence of a liquid medium with a catalyst system comprising: (A) a solid catalyst component containing magnesium, titanium, a halogen and a first electron donor as an essential component; (B) an organic aluminum compound; and (C) a second electron donor compound, wherein (1) the ethylene content (E) in the copolymer is from 3.5 to 7.0% by weight, and (2) the content of a xylene-soluble portion at 20° C. (D) (% by weight) in the copolymer satisfies the relationship $D \leq E+2.0$ (% by weight).

The present invention is also directed to a process for producing a propylene-ethylene random copolymer which comprises copolymerizing propylene with ethylene with a concentration of ethylene in the vapor phase of 2 to 5% by volume in the substantial absence of a liquid medium with a catalyst system comprising: (A) a solid catalyst component containing magnesium, titanium, a halogen and a first electron donor as an essential component; (B) an organoaluminum compound; and (C) a second electron donor compound, wherein the molar ratio of the component (C) to an Al atom in component (B) is from 0.15 to 1.0.

Other objects and advantages of the present invention will be apparent from the description below.

DETAILED DESCRIPTION OF THE INVENTION

The propylene-ethylene random copolymer of the present invention is prepared by using a Ziegler-Natta type of catalyst containing titanium, magnesium, a halogen and an electron donor as an essential component under specific conditions. That is, a propylene-ethylene copolymer is prepared by a process for copolymerizing propylene with ethylene in a gas phase process with use of a catalyst system comprising:

(A) a solid catalyst component containing magnesium, titanium, a halogen and a first electron donor as an essential component;

(B) an organic aluminum compound; and (C) a second electron donor compound.

Examples of the process for producing the solid catalyst component used in the present invention include processes disclosed in Japanese Patent Kokai Nos. 54-94590, 55-36203, 56-41206 and 57-59916; and U.S. Pat. Nos. 4,412,049, 4,672,050, 4,971,937, 9,952,649, 4,157,435, 4,107,413 and 4,983,561; and EP 0 045 975 A, the complete disclosures of which are hereby incorporated by reference.

The solid catalyst component (A) containing magnesium, titanium, a halogen and a first electron donor as an essential component can be a type of titanium-magnesium complex and can be prepared by contacting a titanium compound, a magnesium compound and a first electron donor.

Representative examples of such methods include the following:

(1) Method of reacting a liquid magnesium compound or a complex of a magnesium compound and an electron donor with a depositing agent, followed by treating with a titanium compound or a titanium compound and an electron donor.

(2) Method of treating a solid magnesium compound or a complex of a solid magnesium compound and an electron donor with a titanium compound or a titanium compound and an electron donor.

(3) Method of reacting a liquid magnesium compound with a liquid titanium compound in the presence of an electron donor to deposit a solid titanium complex.

(4) Method of further treating the reaction product prepared in items (1), (2) or (3) with a titanium compound or a titanium compound and an electron donor.

(5) Method of treating a solid product—which is prepared by reducing an alkoxytitanium compound with an organomagnesium compound, such as a Grignard compound, in the presence of an organic silicon compound having a Si—O bond in the presence or absence of an ester of organic acid, —with an ester of organic acid and treating the resultant ester-treated solid product with a mixture of an ether compound and TiCl$_4$ or, alternatively, a mixture of an ether compound, TiCl$_4$ and an ester of organic acid.

(6) Method of treating the reaction product of a metal oxide, dihydrocarbyl magnesium and halogen-containing alcohol, with a halogenating agent optionally present, followed by bringing into contact with an electron donor and a titanium compound.

(7) Method of treating a magnesium compound (e.g., a magnesium salt of an organic acid or an alkoxymagnesium compound) with a halogenating agent optionally present, followed by bringing into contact with an electron donor and a titanium compound.

(8) Method of treating the compounds obtained in the above items (1) to (7) with a halogen, a halogen compound or an aromatic hydrocarbon.

Among these methods for synthesizing the solid catalyst, the methods described in the above items (1) to (5) are preferred, and the method described in item (5) is most preferred. Among the methods described in item (5), the preferred method is reducing an alkoxytitanium compound with an organomagnesium compound such as a Grignard reagent in the presence of an organic silicon compound and an ester compound.

The titanium compound used for synthesizing the solid catalyst component can be, for example, represented by the general formula:

$$Ti(OR)_bX_{4-b}$$

wherein R is a hydrocarbon group having 1 to 20 carbon atoms; X is a halogen atom; and b is a numeral such that 0<b≦4.

Specific examples of R include alkyl groups such as, for example, methyl, ethyl, n-propyl, iso-propyl, n-butyl, iso-butyl, n-amyl, iso-amyl, n-hexyl, n-heptyl, n-octyl, n-decyl, and n-dodecyl; aryl groups such as, for example, phenyl, cresyl, 2,3-, 2,4-, 3,4-, or 3,5-xylyl, and naphthyl; cycloalkyl groups such as, for example, cyclohexyl and cyclopentyl; allyl groups such as, for example, propenyl; and aralkyl groups such as, for example, benzyl.

The magnesium component can be, for example, any organomagnesium compound containing a magnesium-carbon bond. For example, a Grignard compound can be used which is represented by the general formula RMgX (wherein R represents a hydrocarbon group having 1 to 20 carbon atoms and X represents a halogen atom) and a magnesium compound represented by the general formula RR'Mg (wherein R and R' represent a hydrocarbon group having 1 to 20 carbon atoms and may be the same or different).

Examples of the Grignard compound include methylmagnesium chloride, ethylmagnesium chloride, ethylmagnesium bromide, methylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, iso-amylmagnesium chloride, phenylmagnesium chloride, and phenylmagnesium bromide. Examples of the magnesium compound represented by RR'Mg include diethylmagnesium, di-n-propylmagnesium, di-iso-propylmagnesium, di-n-butylmagnesium, di-sec-butylmagnesium, di-tert-butylmagnesium, n-butyl-sec-butylmagnesium, di-n-amylmagnesium, and diphenylmagnesium.

The organic silicon compound having an Si—O bond, which can be used in the above-described process for the synthesis method (5) to make the solid catalyst component, can be represented by the following general formulas:

$$Si(OR^2)_m R^3_{4-m};$$

$$R^4(R^5_2 SiO)_p SiR^6_3;\ or$$

$$(R^7_2 SiO)_q$$

wherein $R^2$ represents a hydrocarbon group having 1 to 20 carbon atoms; $R^3$, $R^4$, $R^5$, $R^6$ and $R^7$ each represent a hydrocarbon group having 1 to 20 carbon atoms or a hydrogen atom; m is a numeral such that 0<m≦4; p is an integer of 1 to 1000; and q is an integer of 2 to 1000.

Specific examples of the organic silicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetra-n-propoxysilane, di-n-propoxydi-n-propylsilane, tetra-n-butoxysilane, di-n-butoxy-n-butylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexa-n-propyldisiloxane, octaethyltrisiloxane, dimethylpolysiloxane, diphenylpolysiloxane, methylhydropolysiloxane, and phenylhydropolysiloxane.

Among these organic silicon compounds, an alkoxysilane compound represented by the general formula $Si(OR^2)_m R^3_{4-m}$ is preferred. Preferably, m is such that 1≦m≦4. A tetraalkoxysilane wherein m is 4 is particularly preferred.

The first electron donor used in the synthesis of the solid catalyst component optionally can be the same as the second electron donor compound (C) described hereinafter, but it is preferably an ester of organic acid.

The ester of organic acid can be, for example, mono- and polyhydric carboxylic acid esters. Examples include aliphatic carboxylic acid esters, olefin carboxylic acid esters, alicyclic carboxylic acid esters, and aromatic carboxylic acid esters. Specific examples include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, n-butyl benzoate, methyl toluate, ethyl toluate, ethyl anisate, diethyl succinate, di-n-butyl succinate, diethyl malonate, di-n-butyl malonate, dimethyl maleate, di-n-butyl maleate, diethyl itaconate, di-n-butyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-octyl phthalate, and diphenyl phthalate.

Esters of olefin carboxylic acid such as, for example, methacrylate or maleate and esters of phthalic acid are preferred. Diesters of phthalic acid are more preferred.

The solid catalyst component (A) can be used alone, or alternatively, can also be used after it is impregnated into a porous substance such as an inorganic oxide or an organic polymer.

Examples of the porous inorganic oxide include $SiO_2$, $Al_2O_3$, MgO, $TiO_2$, $ZrO_2$, $SiO_2$—$Al_2O_3$ double oxide, $MgO_2$—$Al_2O_3$ double oxide, and $MgO$-$SiO_2$—$Al_2O_3$ compound oxide. Examples of the porous organic polymer include styrene polymers, (meth)acrylate polymers, acrylonitrile polymers, vinyl chloride polymers and olefin polymers such as, for example, polystyrene, a styrene-divinylbenzene copolymer, a styrene-N,N'-alkylenedimethacrylamide copolymer, a styrene-ethyleneglycoldimethacrylate copolymer, polyethylacrylate, a methylacrylate-divinylbenzene copolymer, an ethylacrylate-divinylbenzene copolymer, polymethylmethacrylate, a methylmethacrylate-divinylbenzene copolymer, polyethyleneglycoldimethacrylate, polyacrylonitrile, an acrylonitrile-divinylbezene copolymer, polyvinylchloride, polyvinylpyrrolidone, polyvinylpyridine, ethylvinylbenzene-divinylbenzene copolymer, polyethylene, ethylene-methylacrylate copolymer, and polypropylene. $SiO_2$, $Al_2O_3$ and a styrene-divinylbenzene copolymer are prefered examples.

The organoaluminum compound (B) used in the present invention contains at least one Al—carbon bond.

Examples of the organoaluminum compound include trialkylaluminums such as, for example, triethylaluminum, triisobutylaluminum, and trihexylaluminum; dialkylaluminum halides such as, for example, diethylaluminum halide and diisobutylaluminum halide; a mixture of the trialkylaluminum and the dialkylaluminum halide; and alkylalumoxanes such as, for example, tetraethyldialumoxane and tetrabutyldialumoxane. Trialkylaluminums, a mixture of the trialkylaluminum and the dialkylaluminum halide and alkylalumoxanes are preferred examples. Triethylaluminum, a mixture of triisobutylaluminum and diethylaluminum chloride and tetraethyldialumoxane are more preferred examples.

The amount of the organoaluminum compound (B) can be selected within a wide range such as, for example 1 to 1000 mol, and preferably, 5 to 600 mol, based on 1 mol of the titanium atom in the solid catalyst (A).

Examples of the second electron donor compound (C) used in the catalyst system of the present invention include oxygen-containing electron donors such as alcohols, phenols, ketones, aldehydes, carboxylic acids, esters of organic or inorganic acid, ethers, acid amides, and acid anhydrides; and nitrogen-containing electron donors such as ammonia, amines, nitriles, and isocyanates. Esters of inorganic acid and ethers are prefered second electron donors.

Preferred examples of the esters of inorganic acid include silicon compounds represented by the general formula:

$$R^{16}{}_n Si(OR^{17})_{4-n}$$

wherein $R^{16}$ is a hydrocarbon group having 1 to 20 carbon atoms or a hydrogen atom; $R^{17}$ is a hydrocarbon group having 1 to 20 carbon atoms; wherein $R^{16}$ and $R^{17}$ may have the same or different substituent in its molecule; and n is such that $0 \leq n < 4$.

Specific examples include tetramethoxysilane, tetraethoxysilane, tetra-n-butoxysilane, tetraphenoxysilane, methyltrimethoxysilane, ethyltrimethoxysilane, n-butyltrimethoxysilane, isobutyltrimethoxysilane, t-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, di-n-butyldimethoxysilane, diisobutyldimethoxysilane, di-t-butyldimethoxysilane, n-butylmethyldimethoxysilane, butylethyldimethoxysilane, t-butylmethyldimethoxysilane, isobutylisopropyldimethoxysilane, t-butylisopropyldimethoxysilane, hexylmethyldimethoxysilane, hexylethyldimethoxysilane, n-dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyldimethoxysilane, cyclopentyl-t-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-t-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-t-butyldimethoxysilane, phenylcyclopentyldimethoxysilane, vinylmethyldimethoxysilane, methyltriethoxysilane, ethyltriethoxysilane, n-butyltriethoxysilane, isobutyltriethoxysilane, t-butyltriethoxysilane, isopropyltriethoxysilane, cyclohexyltriethoxysilane, phenyltriethoxysilane, vinyltriethoxysilane, dimethyldiethoxysilane, diethyldiethoxysilane, di-n-propyldiethoxysilane, n-propylmethyldiethoxysilane, diisopropyldiethoxysilane, dibutyldiethoxysilane, diisobutuldiethoxysilane, di-t-butyldiethoxysilane, n-butylmethyldiethoxysilane, n-butylethyldiethoxysilane, t-butylmethylethoxysilane, n-hexylmethyldiethoxysilane, n-hexylethyldiethoxysilane, n-dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltri-n-butoxysilane, phenyltri-t-butoxysilane, 2-norbornanetrimethoxysilane, 2-norbornanetriethoxysilane, 2-norbornanemethyldimethoxysilane, trimethylphenoxysilane, and methyltriallyloxysilane.

Preferred examples of an ether second electron donor include dialkylethers and diether compounds represented by the general formula:

$$R^{20}O-CH_2-\underset{\underset{R^{19}}{|}}{\overset{\overset{R^{18}}{|}}{C}}-CH_2-OR^{21}$$

wherein $R^{18}$ to $R^{21}$ each represent a linear or branched alkyl, alicyclic, aryl or arylalkyl group having up to 20 carbon atoms and $R^{18}$ and $R^{19}$ may be hydrogen or a linear or branched alkyl, alicyclic, aryl or arylalkyl group having up to 20 carbon atoms. Examples include diethyl ether, di-n-propyl ether, diisopropyl ether, di-n-butyl ether, di-n-amyl ether, diisoamyl ether, dineopentyl ether, di-n-hexyl ether, di-n-octyl ether, dineopentyl ether, di-n-hexyl ether, di-n-octyl ether, methyl n-butyl ether, methyl isoamyl ether, ethyl isobutyl ether, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-(3', 7'-dimethyloctyl)-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-di-n-propyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, and 2-n-heptyl-2-n-pentyl-1,3-dimethoxypropane.

The second electron donor compound is preferably an organic silicon compound represented by the general formula $R^{22}R^{23}Si(OR^{24})_2$. In this formula, $R^{22}$ is a hydrocarbon group having 3 to 20 carbon atoms wherein a carbon adjacent to Si is a secondary or tertiary carbon. Examples include branched alkyl groups such as isopropyl, sec-butyl, t-butyl, and t-amyl; cycloalkyl groups such as cyclopentyl and cyclohexyl; cycloalkenyl groups such as cyclopentyl; and aryl groups such as phenyl and tolyl. In the formula $R^{23}$ is a hydrocarbon group having 1 to 20 carbon atoms, and examples include linear alkyl groups such as methyl, ethyl, n-propyl, n-butyl, and n-pentyl; branched alkyl groups such as isopropyl, sec-butyl, t-butyl, and t-amyl; cycloalkyl groups such as cyclopentyl and cyclohexyl; cycloalkenyl groups such as cyclopentenyl; and aryl groups such as phenyl and tolyl. In the formula, $R^{24}$ is a hydrocarbon group having 1 to 20 carbon atoms, and preferably a hydrocarbon group having 1 to 5 carbon atoms (such as, for example, methyl, ethyl, n-propyl, isopropyl, and n-butyl).

Specific examples of the organic silicon compound used as the second electron donor include diisopropyldimethoxysilane, diisobutyldimethoxysilane, di-t-butyldimethoxysilane, t-butylmethyldimethoxysilane, isobutylisopropyldimethoxysilane, t-butylisopropyldimethoxysilane, dicyclopentyldimethoxysilane, cyclopentylisopropyldimethoxysilane, cyclopentylisobutyldimethoxysilane, cyclopentyl-t-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-t-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-t-butyldimethoxysilane, phenylcyclopentyldimethoxysilane, diisopropyldiethoxysilane, diisobutyldiethoxysilane, di-t-butyldiethoxysilane, t-butylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, and 2-norbornanemethyldimethoxysilane.

The molar ratio of Al atom in component (B) to the Ti atom in component (A) is preferably 1 to 1000, and more preferably, 5 to 200. The molar ratio of component (C) to Al atom in component (B) is preferably 0.15 to 1.0, and more preferably, 0.2 to 0.7.

The polymerization is carried out by feeding propylene, ethylene and hydrogen as a molecular weight regulator under polymerization conditions which achieve the objects of the present invention.

In the gas phase polymerization, a reactor having a fluidized bed therein is generally used, and fluidized solid catalyst particles on the fluidized bed are contacted with gaseous monomer feed (propylene and ethylene). Solid catalyst particles are fluidized on the fluidized bed by the stream of the gaseous monomer feed from the lower part of the fluidized bed.

Polymerization temperature can be, for example, 20 to 150° C., and preferably, 50 to 95° C., and more preferably, 70 to 90° C. Polymerization pressure can be, for example, from atmospheric pressure to 40 kg/cm²G, and preferably, from 2 to 30 kg/cm²G, in the substantial absence of a liquid medium. This substantial absence means liquid medium is preferably not present, but small amounts may be present to the extent the invention is not compromised.

The amount of hydrogen is not critical and can be properly determined by a person skilled in the art so that molecular weight is controlled to achieve the desired objectives.

The concentration of ethylene in the gas phase in the polymerization is generally 2 to 5% by volume so that the ethylene content in the propylene-ethylene random copolymer obtained becomes within the range of 3.5 to 7.0% by weight.

A preliminary polymerization step is preferably effected as illustrated in the examples discussed later herein.

According to the process of the present invention, a powdered propylene-ethylene random copolymer can be prepared. The intrinsic viscosity of the copolymer in tetralin at 135° C. is preferably not less than 2.0 dl/g. There is a tendency for deterioration of appearance due to bleed whitening when the intrinsic viscosity is less than 2.0 dl/g.

The amount of the xylene-soluble portion at 20° C. contained in the propylene-ethylene random copolymer varies depending on the catalyst, catalyst composition (proportion of the catalyst components (A), (B) and (C)), and polymerization conditions such as temperature. Therefore, the selection of the polymerization conditions is important.

When the ethylene content or amount of the xylene-soluble portion at 20° C. is not within the above range of the present invention, it is difficult to obtain a film having an excellent appearance and having an excellent balance between low-temperature heat-sealing property and rigidity.

When the ethylene content of the propylene-ethylene random copolymer is less than 3.5% by weight, the low-temperature heat-sealing property tends to be inferior. On the other hand, when it exceeds 7.0% by weight, the heat resistance and rigidity become inferior and deterioration of the appearance occurs due to bleed whitening. Therefore, the ethylene content can be from 3.5 to 7.0% by weight, and preferably, from 4.0 to 6.5% by weight.

It is also important that the content of the xylene-soluble portion at 20° C. (D) satisfies the relationship $D \leq E+2.0$ (% by weight), and preferably, $D \leq E+1.5$ (% by weight). When the content of the xylene-soluble portion at 20° C. falls outside of this range, the appearance due to bleed whitening and rigidity becomes poor.

The melt flow rate of the propylene-ethylene random copolymer (powder) of the present invention can be adjusted by melt-kneading the random copolymer with, for example, a melt extruder or a Banbury mixer in the presence of an antioxidant and, for example, in the presence or absence of an organic peroxide.

The melt flow rate of the propylene-ethylene random copolymer is preferably 1 to 50 g/10 minutes, and more preferably, 3 to 20 g/10 minutes, in view of the need for transparency and high-speed processability in film-forming.

It is possible to prepare a film by melt extrusion which causes minimal or no bleed whitening (Δhaze: not more than 1.5%) and has a heat-sealing temperature of not more than 130° C., high Young's modulus (not less than 2500 kg/cm$^2$), excellent appearance and excellent balance between the low-temperature heat-sealing property and rigidity.

The film of the present invention is preferably a film having a thickness of 10 to 500μ, and more preferably non-stretched film having a thickness of 10 to 100μ. The film can be used as one of the layer components in the production of a multilayer film according to a coextrusion film-forming process because it has the above-described preferable characteristics.

The shape forming process of the film of the present invention can be any conventional process such as, for example, a melt extrusion molding process such as, for example, a T-die film-forming process or a tubular film-forming process. The T-die film forming process is preferred wherein high-speed film-forming is conducted with a large-sized film-forming machine.

There can be optionally added, for example, normally used antioxidants, neutralizing agents, lubricants, anti-blocking agents, and antistatic agents.

A propylene-ethylene random copolymer, and film thereof, having excellent appearance, heat-sealing, and rigidity has been disclosed in JP-7-224,160 filed Aug. 31, 1995, the complete disclosure of which is hereby incorporated by reference.

EXAMPLES

The present invention is explained in further detail with use of the following Examples, but it is not limited thereto.

The following parameters of the present invention were determined by the following methods.

(1) Ethylene content was determined by the method described in Polymer Analysis Hand Book (1985, published by Asakura Shoten), page 256, item of "(i) Random Copolymer" with use of an IR spectral method, the complete disclosure of which is hereby incorporated by reference.

(2) Intrinsic viscosity ([η]) was measured in tetralin at 135° C. using an Ubbelohde viscometer.

(3) Xylene-soluble portion at 20° C.

After a sample (1 g) was completely dissolved in boiling xylene (100 ml), the resulting solution was cooled to 20° C. and allowed to stand for 4 hours. After separating into a deposited material and a filtrate by filtration, the filtrate was evaporated and dried at 70° C. under reduced pressure. A weight of the resultant substance was measured to determine the content (% by weight).

(4) Melt flow rate (MFR) was measured by the method of condition-14 according to JIS K7210.

(5) Transparency (haze) was measured according to JIS K7105.

(6) Bleed whitening (Δhaze)

A haze measurement after heat treatment at 60° C. for 24 hours was compared with the value before heat treatment and the difference between them was taken as Δhaze.

(7) Heat-sealing temperature

A heat-sealed film having a width of 25 mm was prepared by laminating the film surfaces to each other and press-bonding under a load of 2 kg/cm$^2$ for 2 seconds with a heated heat sealer, allowed to stand overnight, and then peeled off at 23° C. under conditions of a peeling rate of 200 mm/minute and a peeling angle of 180°. The temperature of the heat sealer at which the resultant peeling resistance becomes 300 g/25 mm was taken as the heat-sealing temperature.

(8) Young's modulus

A specimen having a width of 20 mm was cut in the longitudinal direction (MD) and a stress-strain curve was determined with a tensile tester under conditions of chuck distance of 60 mm and tensile speed of 5 mm/minute to measure an initial modulus.

Reference Example 1

(a) Synthesis of organomagnesium compound

An inner atmosphere of a 1000 ml flask equipped with a stirrer, a dropping funnel and a thermometer was replaced with argon. Magnesium flakes for Grignard compound preparation (32.0 g) were introduced into the flask. n-butyl chloride (120 g) and di-n-butyl ether (500 ml) were charged in the dropping funnel and about 30 ml was added dropwise to the magnesium in the flask to initiate reaction. After initiation of the reaction, dropping was continued at 50° C. over 4 hours. After dropping, the reaction was continued at 60° C. for an additional one hour. Then, the reaction solution was cooled to room temperature, and solid matter was removed by filtration. n-butylmagnesium chloride in the sampled reaction solution was hydrolyzed with 1N sulfuric acid and then subjected to back titration with an aqueous 1N sodium hydroxide solution to determine the concentration (phenolphtalein was used as an indicator). The concentration was 2.1 mol/liter.

(b) Synthesis of solid product

An inner atmosphere of a 500 ml flask equipped with a stirrer and a dropping funnel was replaced with argon. n-hexane (290 ml), tetra-n-butoxytitanium (9.3 ml, 9.3 g, 27 mmol), diisobutyl phthalate (8.5 ml, 8.8 g, 32 mmol) and tetraethoxysilane (79.1 ml, 74.4 g, 357 mmol) were charged into the flask to give a homogeneous solution. Then, the organomagnesium compound solution (189 ml) synthesized in the above (a) was gradually added dropwise from the dropping funnel over 2 hours while maintaining the inside temperature of the flask at 5° C. After dropping, the resultant reaction mixture was stirred at room temperature for an additional one hour and was separated into a solid and a liquid. After washing repeatedly three times with 300 ml of hexane and three times with 300 ml of toluene, 270 ml of toluene was added. A part of the solid product in the resulting slurry was subjected to composition analysis. This analysis indicated that the solid product contained 1.8% by weight of the titanium atom, 0.5% by weight of the phthalic acid ester, 30.7% by weight of ethoxy group and 3.3% by weight of butoxy group. The slurry concentration was 0.140 g/ml.

(c) Synthesis of ester-treated solid

An inner atmosphere of a 200 ml flask equipped with a stirrer, a dropping funnel and a thermometer was replaced with argon. 84 ml of a slurry containing the solid product obtained in the above (b) was charged into the flask and a supernatant (12.1 ml) was taken out. Then, diisobutyl phthalate (7.8 ml, 29 mmol) was added, and reaction was carried out at 95° C. for 30 minutes. After completion of the reaction, the reaction mixture was separated into a solid and a liquid and washed twice with 59 ml of toluene.

(d) Synthesis (activation treatment) of solid catalyst component

After washing in the above (c), toluene (15.3 ml), diisobutyl phthalate (0.66 ml, 2.5 mmol), butyl ether (1.2 ml, 6.9 mmol) and titanium tetrachloride (23.4 ml, 0.213 mmol)

were added to the flask and the reaction was conducted at 95° C. for 3 hours. After completion of the reaction, the reaction mixture was separated into a solid and a liquid at the same temperature and washed twice with 59 ml of toluene at the same temperature. Then, toluene (12.0 ml), n-butyl ether (1.2 ml, 6.9 mmol) and titanium tetrachloride (11.7 ml, 0.106 mmol) were added and the reaction was conducted at 95° C. for one hour. After completion of the reaction, the reaction mixture was separated into a solid and a liquid at the same temperature, washed three times with 59 ml of toluene and three times with 59 ml of n-hexane at the same temperature, and then dried under reduced pressure to obtain 8.1 g of a solid catalyst component.

Compositional analysis indicated 1.4% by weight of titanium atom, 20.3% by weight of magnesium atom, 10.0% by weight of phthalate and 62.6% by weight of a halogen atom. The solid catalyst component was observed with a microscope. It had good particle properties and contained no fine powder.

Example 1

(a) Preliminary polymerization

Sufficiently purified hexane (150 L) was added to a 250 L reactor equipped with a stirrer and, after sufficiently replacing the inside of the system with nitrogen, triethylaluminum (hereinafter referred to as "TEA") (3.2 mol), cyclohexylethyldimethoxysilane (hereinafter referred to as "CHEDMS") (0.32 mol) and the solid catalyst obtained in Reference Example 1 (51.8 g, in terms of Ti atom) were added. Then, propylene (2.8 kg) was continuously added over 2 hours while maintaining the temperature at 25° C.

(b) Polymerization

A polymerization vessel was used having an internal volume of 1000 L. A continuous vapor phase polymerization was carried out. A preliminary polymerized slurry (1.1 g/hour) as the solid catalyst component, TEA (52 mmol/hour) and CHEDMS (16 mmol/hour) [CHEDMS/TEA (molar ratio)=0.31] were fed together with propylene, ethylene and hydrogen. The polymerization temperature was maintained at 75° C.; the polymerization pressure 18 kg/cm²G; the ethylene concentration in vapor phase 2.29% by volume; and hydrogen concentration of 0.15% by volume.

The resulting copolymer had an intrinsic viscosity of 2.77 dl/g, an ethylene content of 4.3% by weight and a xylene-soluble fraction at 20° C. of 4.1 by weight. To 100 parts by weight of this copolymer were added, 0.2 part by weight of calcium stearate, 0.1 part by weight of Sumilizer BHT (Sumitomo Chemical Co., Ltd.), 0.10 part by weight of Irganox 1010 (Ciba Geigy Limited), 0.10 part by weight of erucic amide, 0.15 part by weight of finely-ground silica and 0.4 part by weight of 2,5-dimethyl-2,5-di(tertiary-butylperoxy)hexane (hereinafter referred to as "2,5-H"). After mixing with a Henschel mixer in a nitrogen atmosphere, the mixture was melt-extruded to obtain pellets. MFR of the pellets was 7.6 g/10 minutes. Then, the resulting pellets were melt-extruded at a die temperature of 250° C. with a 50 mmϕ T-die film-forming apparatus and cooled by a cooling roll, wherein cooling water at 30° C. was passed through, to obtain a non-stretched film having a thickness of 30μ.

The characteristics of the polymer powder and MFR of the pellets as well as transparency (haze), bleed whitening (Δhaze), heat-sealing temperature and Young's modulus of the resultant film are shown in Table 1.

Example 2

A copolymer was produced in the same manner as in Example 1 except the ethylene concentration in the vapor phase and hydrogen concentration were changed to 3.00% by volume and 0.13% by volume, respectively. Pellets were obtained and evaluated in the same manner as in Example 1 except that the amount of 2,5-H was 0.6 part by weight per 100 parts by weight of the copolymer.

The characteristics of the polymer powder and MFR of pellets as well as transparency (haze), bleed whitening (Δhaze), heat-sealing temperature and Young's modulus of the resultant film are shown in Table 1.

Reference Example 2

(a) Synthesis of solid product

An inner atmosphere of a 500 ml flask equipped with a stirrer and a dropping funnel was replaced with argon. Hexane (240 ml), tetra-n-butoxytitanium (5.4 g, 15.8 mmol) and tetraethoxysilane (61.4 g, 295 mmol) were charged into the flask to give a homogeneous solution. Then, the organomagnesium compound solution (150 ml) synthesized in Reference Example 1(a) was gradually added dropwise from the dropping funnel over 4 hours while maintaining the inside temperature of the flask at 5° C. After completion of the dropping, the reaction mixture was stirred at room temperature for an additional one hour and separated into a solid and a liquid. After the separated solid product was washed repeatedly three times with 240 ml of hexane and dried under reduced pressure, 45.0 g of a brown solid product was obtained.

Compositional analysis indicated 1.7% by weight of titanium, 33.8% by weight of ethoxy group and 2.9% by weight of butoxy group in the solid product.

A clear diffraction peak was not observed in a wide-angle X-ray diffraction pattern of Cu-Ka rays of this solid product which indicated that the solid product has an amorphous structure.

(b) Synthesis of ester-treated solid

An inner atmosphere of a 100 ml flask was replaced with argon. 6.5 g of the solid product synthesized in the above item (b), toluene (16.2 ml) and diisobutyl phthalate (4.3 ml, 16 mmol) were added and the reaction was carried out at 95° C. for one hour.

(c) Synthesis (activation treatment) of solid catalyst component

After washing in the above item (c), toluene (16.2 ml), diisobutyl phthalate (0.36 ml, 1.3 mmol), n-butyl ether (2.2. ml, 13 mmol) and titanium tetrachloride (38.0 ml, 346 mmol) were added to the flask and the reaction was conducted at 95° C. for 3 hours. After completion of the reaction, the reaction mixture was separated into a solid and a liquid at the same temperature and washed twice with 33 ml of toluene at the same temperature. Then, the above-described treatment with a mixture of diisobutyl phthalate, butyl ether and titanium tetrachloride was repeated under the same conditions, followed by washing three times with 33 ml of hexane to obtain 5.0 g of a yellow ocher-colored, or mud yellow colored, solid catalyst.

Compositional analysis indicated contents of 0–30 2.1% by weight of titanium atom, 19.9% by weight of magnesium atom, 12.7% by weight of phthalate and 63.7% by weight of halogen atom.

Example 3

A copolymer was obtained in the same manner as in Example 1 except that the ethylene concentration of the vapor phase and hydrogen concentration were changed to 2.21% by volume and 0.13% by volume, respectively. The preliminary polymerized slurry described in Reference Example 2 was used, and TEA (51 mmol/hour) and CHEDMS (33 mmol/hour) [CHEDMS/TEA (molar ratio)= 0.65] were fed.

The copolymer was pelletized and subjected to film-forming evaluation in the same manner as in Example 1 except for changing the added amount of 2,5-H to 0.2 part by weight per 100 parts by weight of the copolymer.

The characteristics of the polymer powder and MFR of pellets as well as transparency (haze), bleed whitening (Δhaze), heat-sealing temperature and Young's modulus of the resultant film are shown in Table 1.

Comparative Example 1

Using a polymerization vessel having an internal volume of 1000 L, a continuous vapor phase polymerization was carried out while feeding the solid catalyst synthesized according to Example 3 of Japanese Patent Kokai No. 3-46001 (1.1 g/hour) from dimethylaluminum chloride (DEAC, 135 mmol/hour) and methyl methacrylate (MMA, 3.5 mmol/hour) [MMA/DEAC (molar ratio)=0.03]. Propylene, ethylene and hydrogen were fed so that a polymerization temperature of 65° C., a polymerization pressure of 18 kg/cm$^2$G, an ethylene concentration of vapor phase part of 1.27% by volume and a hydrogen concentration of 5.6% by volume was maintained. The resultant copolymer was pelletized and subjected to film-forming evaluation in the same manner as in Example 1 except for adding no 2,5-H.

The characteristics of the polymer powder and MFR of the pellets as well as transparency (haze), bleed whitening (Δhaze), heat-sealing temperature and Young's modulus of the resultant film are shown in Table 1.

Reference Example 3

A 210 L reactor was equipped with a stirrer and 2.4 mol (in TEA terms) of a product prepared previously by mixing TEA with phenyltrimethoxysilane (hereinafter referred to as "PTMS") [PTMS/TEA (molar ratio)=0.15] in hexane, followed by reacting at 60° C. for 15 hours, and 18.5 g (in terms of Ti atom) of the solid catalyst obtained in Reference Example 2 were added. Propylene was continuously added over 3.2 hours while maintaining at 20° C. or less. Then, unreacted propylene and butane were purged, followed by flowing dry nitrogen to obtain a preliminary polymerized catalyst.

Comparative Example 2

A copolymer was prepared in the same manner as in Example 1 except that the ethylene concentration of the vapor phase and hydrogen concentration were 2.51% by volume and 0.47% by volume, respectively, and feeding the preliminary polymerized slurry obtained in Reference Example 3 (1.1 g/hour) as the solid catalyst component and the reaction product of TEA and PTMS [PTMS/TEA (molar ration)=0.15] described in the Reference Example (50 mmol/hour, in TEA terms).

The copolymer was pelletized and subjected to film-forming evaluation in the same manner as in Example 1 except that no 2,5-H was added.

The characteristics of the polymer powder and MFR of the pellets as well as transparency (haze), bleed whitening (Δhaze), heat-sealing temperature and Young's modulus of the resultant film are shown in Table 1.

Comparative Example 3

A copolymer was obtained in the same manner as in Example 3 except the ethylene concentration of the vapor phase and hydrogen concentration were changed to 2.68% by volume and 0.16% by volume, respectively, and TEA (51 mmol/hour) and CHEDMS (5.0 mmol/hour) [CHEDMS/TEA (molar ratio)=0.10] were fed.

The copolymer was pelletized and subjected to film-forming evaluation in the same manner as in Example 1 except for changing the added amount of 2,5-H to 0.2 part by weight to 100 parts by weight of the copolymer.

The characteristics of the polymer powder and MFR of the pellets as well as transparency (haze), bleed whitening (Δhaze), heat sealing temperature and Young's modulus of the resultant film are shown in Table 1.

Comparative Example 4

A copolymer was prepared in the same manner as in Example 3 except the ethylene concentration of the vapor phase and hydrogen concentration were changed to 1.00% by volume and 0.07% by volume, respectively, and TEA (93 mmol/hour) and CHEDMS (6.8 mmol/hour) [CHEDMS/TEA (molar ratio)=0.07] were fed.

The copolymer was pelletized and subjected to film-forming evaluation in the same manner as in Example 1 except that no 2,5-H was added.

The characteristics of the polymer powder and MFR of the pellets as well as transparency (haze), bleed whitening (Δhaze), heat-sealing temperature and Young's modulus of the resultant film are shown in Table 1.

Thus, according to the present invention, a propylene-ethylene random copolymer can be prepared which gives a film and which causes no deterioration of an appearance due to bleed whitening, and which has an excellent balance between low temperature heat-sealing properties and rigidity.

While the invention has been described in detail and with reference to specific embodiments thereof, it will be apparent to those of ordinary skill in the art that various changes and modifications can be made therein without departing from the spirit and scope thereof.

TABLE 1

| | Random copolymer powder | | | Physical properties of film | | | |
| --- | --- | --- | --- | --- | --- | --- | --- |
| | [η] dl/g | Ethylene content, % by weight | Xylene-soluble part at 20° C. % by weight | Pellet MFR, g/10 minutes | Haze % | Δ Haze % | Heat-sealing temperature ° C. | Young's modulus kg/cm$^2$ |
| Example 1 | 2.77 | 4.3 | 4.1 | 7.6 | 1.4 | 0.6 | 122 | 3500 |
| Example 2 | 2.89 | 5.8 | 6.1 | 6.1 | 2.8 | 1.4 | 117 | 3000 |
| Example 3 | 2.16 | 5.1 | 6.2 | 5.7 | 0.8 | 0.6 | 121 | 3400 |

TABLE 1-continued

|  | Random copolymer powder | | | | Physical properties of film | | | |
| --- | --- | --- | --- | --- | --- | --- | --- | --- |
|  | [η] dl/g | Ethylene content, % by weight | Xylene-soluble part at 20° C. % by weight | Pellet MFR, g/10 minutes | Haze % | Δ Haze % | Heat-sealing temperature ° C. | Young's modulus kg/cm² |
| Comparative Example 1 | 1.72 | 3.3 | 5.4 | 11.6 | 2.0 | 0.6 | 135 | 4500 |
| Comparativa Example 2 | 1.80 | 4.2 | 7.6 | 5.5 | 2.8 | 3.1 | 133 | 3600 |
| Comparative Example 3 | 2.07 | 5.5 | 8.5 | 1.4 | 1.3 | 5.1 | 123 | 3000 |
| Comparative Example 4 | 2.22 | 2.3 | 3.4 | 6.8 | 10.0 | 0 | 143 | 7000 |

What is claimed is:

1. A film having a haze of not more than 1.5%, a heat-sealing temperature of not more than 130° C. and a Young's modulus of not less than 2500 kg/cm², obtained by melt-extruding a propylene-ethylene random copolymer, having a melt flow rate measured by the method of condition-14 according to JIS K7210 of 3 to 20 g/10 min, prepared by copolymerizing propylene with ethylene in the substantial absence of a solvent, with a catalyst system comprising:

(A) a solid catalyst component containing magnesium, titanium, halogen, and a first electron donor as essential components, (B) an organoaluminum compound, and (C) a second electron donor compound, wherein an ethylene content, E, of said copolymer is from 4.3 to 7.0% by weight, and a content of a xylene-soluble portion at 20° C. of said copolymer, D, satisfies the relationship $D \leq E+2.0$, and wherein the molar ratio of Al atom in the organoaluminum compound to Ti atom in the solid catalyst component is 1 to 1000, and the molar ratio of the second electron donor compound to Al atom in the organoaluminum compound is 0.15 to 1.0.

2. A film according to claim 1, wherein a molar ratio of said component (C) to an Al atom in said component (B) in the catalyst system of claim 1 is from 0.15 to 1.0, wherein the ethylene content, E, is from 4.3 to 6.5 percent by weight, wherein the content of a xylene-soluble portion at 20° C. of said copolymer, D, satisfies the relationship, $D \leq E+1.5$, and wherein an intrinsic viscosity for said copolymer measured in tetralin at 135° C. is not less than 2.0 dl/g.

3. A film according to claim 1, wherein said component (A) is prepared by treating a solid product, which solid product is obtained by reducing an alkoxytitanium compound with an organomagnesium compound in the presence of an organosilicon compound having a Si—O bond, in the presence or absence of an ester of an organic acid, treating said solid product with an ester of organic acid, and treating the resulting ester-treated solid with a mixture of an ether compound and $TiCl_4$ or a mixture of an ether compound, $TiCl_4$ and an ester of an organic acid.

* * * * *

UNITED STATES PATENT AND TRADEMARK OFFICE
CERTIFICATE OF CORRECTION

| | | |
|---|---|---|
| PATENT NO. | : 6,057,413 | |
| APPLICATION NO. | : 08/706754 | |
| DATED | : May 2, 2000 | |
| INVENTOR(S) | : Seiichiro Ima et al. | |

It is certified that error appears in the above-identified patent and that said Letters Patent is hereby corrected as shown below:

Column 15, line 18, "a haze" is corrected to "a $\Delta$ haze".

Signed and Sealed this

Twentieth Day of September, 2011

David J. Kappos
*Director of the United States Patent and Trademark Office*